H. D. MEEK.
BEET HARVESTER.
APPLICATION FILED FEB. 28, 1911.

1,111,078.

Patented Sept. 22, 1914.
6 SHEETS—SHEET 1.

Fig. 1.

Witnesses
Howard D. Orr.
F. T. Chapman.

Inventor,
H. D. Meek,
E. G. Siggers
Attorney

H. D. MEEK.
BEET HARVESTER.
APPLICATION FILED FEB. 28, 1911.

1,111,078.

Patented Sept. 22, 1914.
6 SHEETS—SHEET 2.

Witnesses
Howard D. Orr.
F. T. Chapman.

Inventor,
H. D. Meek,
By E. G. Siggers
Attorney

H. D. MEEK.
BEET HARVESTER.
APPLICATION FILED FEB. 28, 1911.

1,111,078.

Patented Sept. 22, 1914.

WITNESSES
Howard D. Orr.
F. T. Chapman

H. D. Meek, INVENTOR,
BY E. G. Siggers
ATTORNEY

UNITED STATES PATENT OFFICE.

HAMILTON DUNBAR MEEK, OF POLK, IOWA.

BEET-HARVESTER.

1,111,078.   Specification of Letters Patent.   Patented Sept. 22, 1914.

Application filed February 28, 1911. Serial No. 611,475.

*To all whom it may concern:*

Be it known that I, HAMILTON DUNBAR MEEK, a citizen of the United States, residing at Polk, in the county of Polk and State of Iowa, have invented a new and useful Beet-Harvester, of which the following is a specification.

This invention has reference to improvements in beet harvesters and its object is to provide a machine which will top, pull and load beets, especially sugar beets.

The invention comprises a machine wherein numerous adjustments are provided, the machine having plows provided on opposite sides of the rows of beets to loosen the dirt, and immediately following the plows are lifting devices which engage the loosened bodies of the beets and pull them out of the ground and ultimately deposit them upon a conveyer, the operation loosening adherent dirt from the bodies and the conveyer carries the beets to a suitable point of disposition, such as a cart or wagon, or the beets may be simply deposited on the ground out of the way to be subsequently gathered.

The invention will be best understood from a consideration of the following detailed description, taken in connection with the accompanying drawings forming a part of this specification, with the understanding, however, that while the showing of the drawings is that of a practical embodiment of the invention, the latter is not confined to the exact details of structure, proportions of parts, or arrangement of parts shown in the drawings, since the invention is capable of other embodiments which retain the salient features thereof.

Referring to the drawings, there is shown a main frame composed of side beams 1, 2 and intermediate beams 3, 4, all in parallel spaced relation and connected together at the ends by end beams 5, 6, respectively. This frame is thus described in particular more for the purpose of facilitating the description to follow than for describing a mandatory arrangement of the frame members, since this frame may be otherwise constructed than shown, so long as it is adapted to support the various structures making up the machine. The frame may be made of wood or metal and the material from which the frame is made will determine to an extent the particular shape and arrangement of the several parts making up the frame.

In the particular structure shown the frame may be considered as made of wood and the longitudinal and end members may be termed longitudinal and end beams. About midway of the longitudinal beams there are provided end supports 7 for axles 8, 9, respectively, the axles being in the form of rods each mounted in a respective outer beam and the next adjacent inner longitudinal beam. These axles are in alinement one with the other, but do not encroach to any material extent upon the space between the beams 3 and 4. Each axle 8 and 9 carries a traction wheel 10 free to rotate thereon and located close to the inner edge of the respective longitudinal beams 1 and 2, and each wheel may be provided with peripheral studs 11 or any other means commonly employed to make the wheels bite into the ground, these wheels being utilized as the machine is drawn over the ground to cause the actuation of various mechanisms to be described.

The axle 8 has mounted thereon a sprocket wheel 12 from which extends a sprocket chain 13 to a sprocket pinion 14 on a counter-shaft 15 mounted in journal bearings 16 on the respective longitudinal beams 1 and 3 to the rear of the axle 8, considering the direction of travel of the machine, and so located as to be in noninterfering relation with the corresponding wheel 10.

Mounted on the axle 9 is a sprocket wheel 18 from which there extends a sprocket chain 19 carried to and around a sprocket pinion 20 on a countershaft 21 mounted in bearings carried by the beams 2 and 4 near the rear end of the frame, and the chain also engages another sprocket pinion 22 on a countershaft 23 also having journal bearings carried by the beams 2 and 4 between the countershaft 21 and the wheel 10, the chain 19 engaging the pinion 22 by one run only, so that the directions of rotation of the shafts 21 and 23 may be opposite. The wheels 10 are connected to the respective sprocket wheels 12 and 18 by one-way clutches 10$^a$ of any appropriate construction, which it is not deemed necessary to show, so that the traction wheels drive only when the machine is moving forward. The clutches may be of the ordinary pawl and ratchet type, so that the pawls may be moved to the inactive position to permit the machine to be moved from place to place without operating the various mechanisms. Between the beams 3 and 4 there is a rod 23$^a$ in line with the shaft 23 and secured in brackets 24 fast to the respective beams 3 and 4 on the facing portions thereof.

Figure 14:
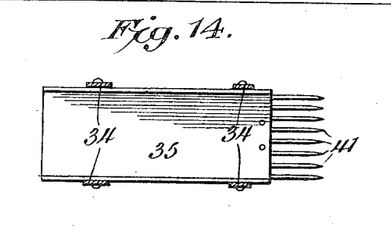
Fig. 14 is a section on the line 14—14 of Fig. 4 with some parts omitted.

The rod 23$^a$ serves as a pivotal support for one end of each of two bars 25, 26, the rod traversing the corresponding ends of the bars 25 and 26 which are provided with suitable hubs for the purpose. The other ends of the bars 25 and 26 project toward the front of the machine from the rod 23$^a$, and at their forward ends carry a picker shaft 27, the respective bars 25 and 26 being held in proper relation to each other by spacing bars 28 and are provided with journal bearings 29 for the picker shaft. The bars 25 and 26 have fast thereto straps 30 directed downwardly with relation to the normal position of the machine, and at their ends formed with bearings for a shaft 31, on which is mounted a sprocket pinion 32 and the ends of a conveyer frame 33, from which latter there depend other straps 34 carrying a conveyer trough 35 in fixed parallel relation to the frame 33. That end of the frame 33 remote from the shaft 31 carries another shaft 36 on which is fixed a sprocket wheel 37, the two sprocket wheels 32 and 37 being engaged by an endless sprocket chain 38 carrying cross bars 39 each provided with a row of outstanding pins 40. The trough 35, shown separately in Fig. 14, has at its forward end a series of projecting fingers 41 which may be slightly upturned at the free ends with relation to the plane of the bottom of the trough, while the latter is inclined with relation to the machine from the forward or filling end toward the rear or discharge end, the rear end of the trough being beneath and extending back of the rear beam 5. Fast to the beam 5 are blocks 42 carrying journal bearings 43 for the shaft 36. As will hereinafter appear, the bars 25 and 26 move about the longitudinal axis of the rod 23$^a$ as a center, and the forward end of the conveyer trough 35 and parts carrying the same participate in this movement, the whole conveyer turning about the shaft 35 as a center, so that the filling end of the conveyer may be elevated or lowered with respect to the ground as may be necessary, and at the will of an operator, by means of mechanism to be described.

Figure 1:
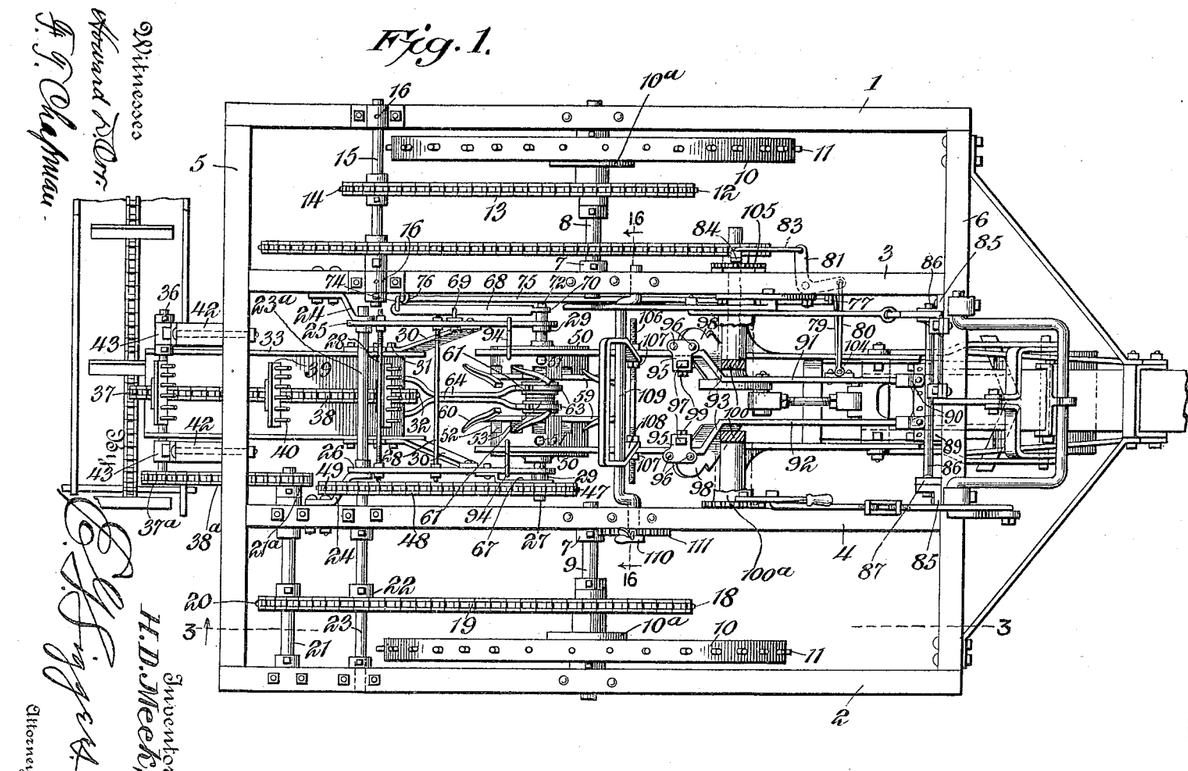
—Figure 1 is a plan view of the machine.
Figures 2, 13:
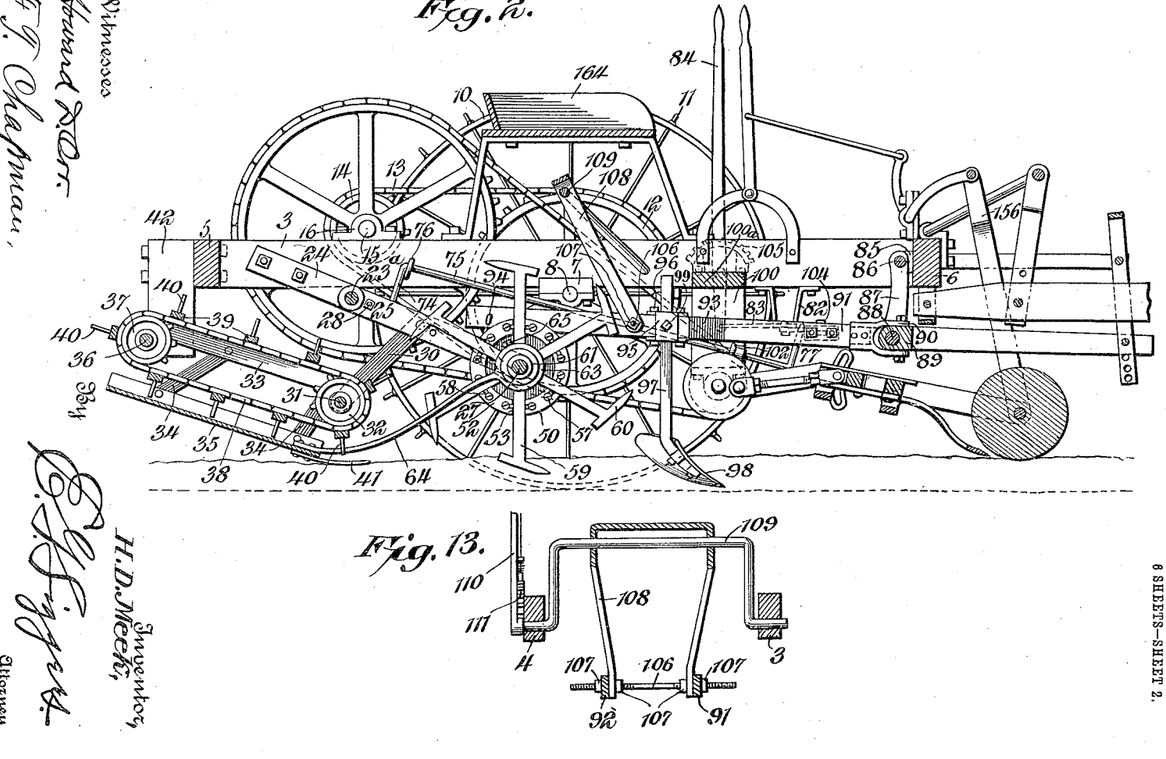
Fig. 2 is a central longitudinal vertical section with the parts in operative position for the digging of beets.
Fig. 13 is a section on the line 16—16 of Fig. 1.
Figure 3:
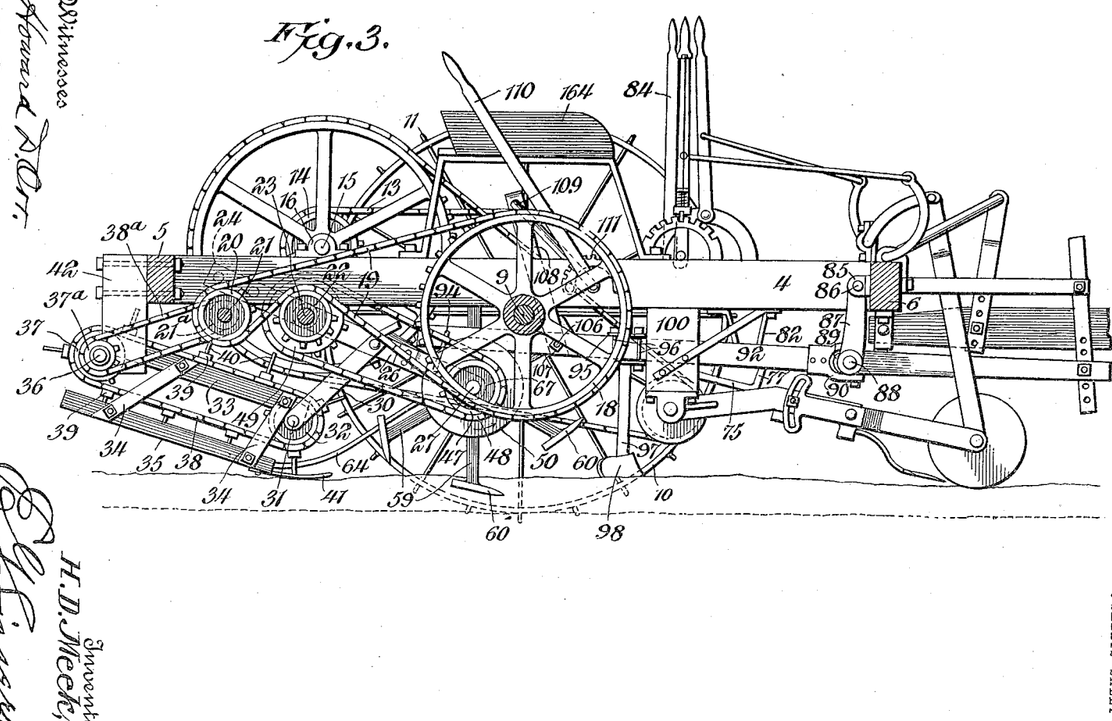
Fig. 3 is a section on the line 3—3 of Fig. 1.
Figure 4:
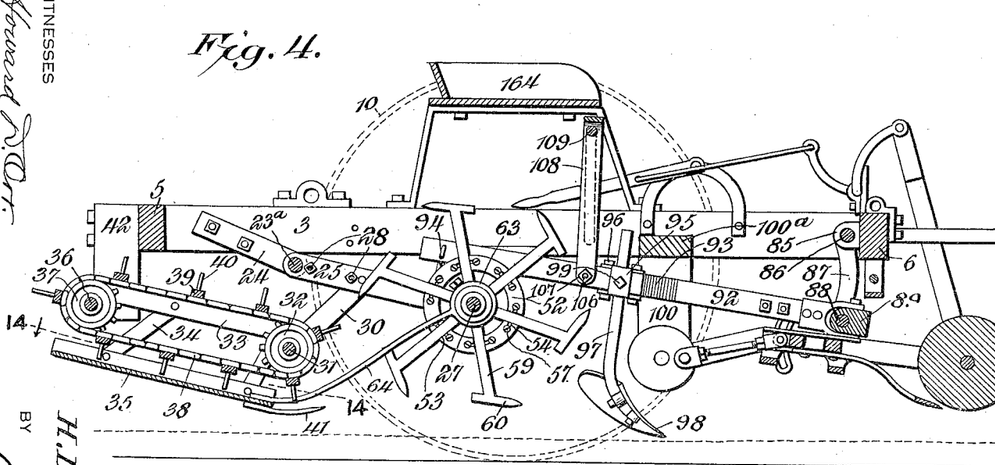
Fig. 4 is a section similar to that of Fig. 2, but with some of the remoter parts omitted or only schematically indicated, the parts illustrated being shown in elevated or inoperative position.
Figures 5, 6, 7, 8:
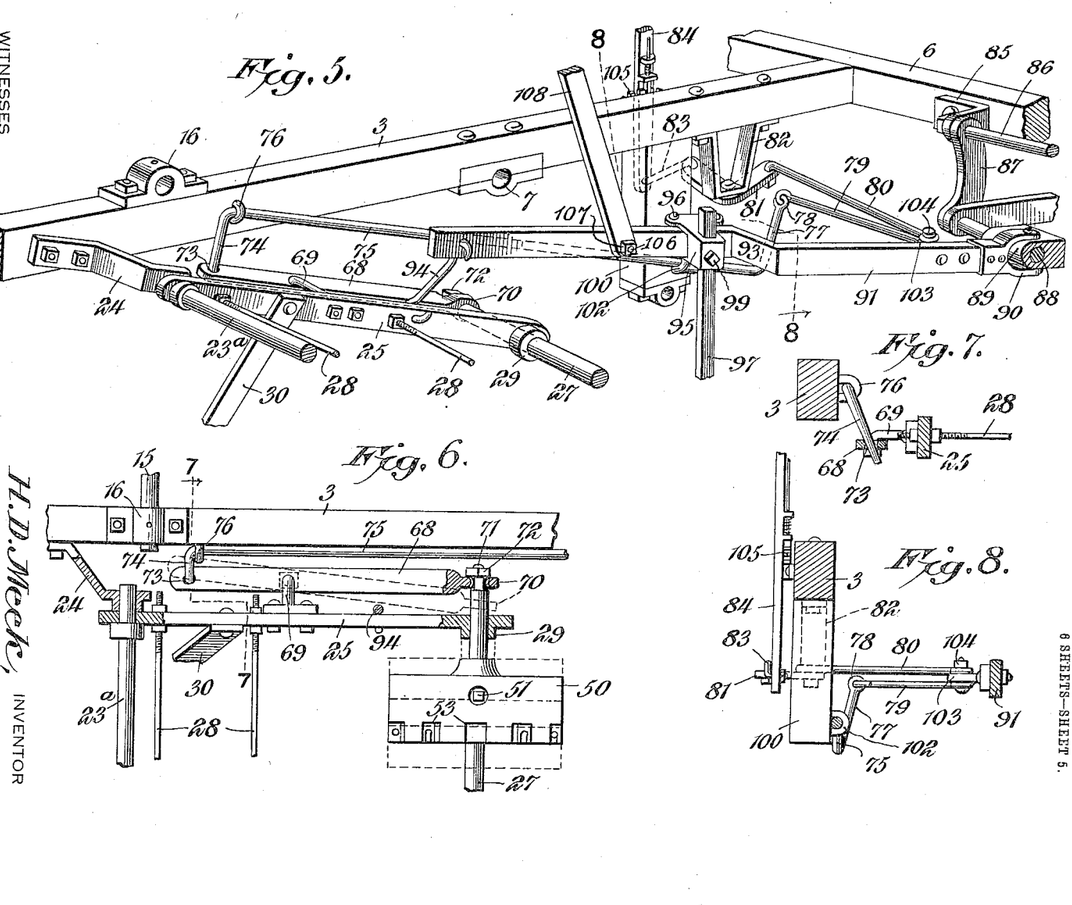
Fig. 5 is a perspective view of a portion of the controlling mechanism for the picker shaft and for other parts of the machine.
Fig. 6 is a plan view with parts in section and other parts omitted from Fig. 5 added, of the left hand end of the showing of Fig. 5.
Fig. 7 is a section on the line 7—7 of Fig. 6.
Fig. 8 is a section on the line 8—8 of Fig. 5.
Figure 9:
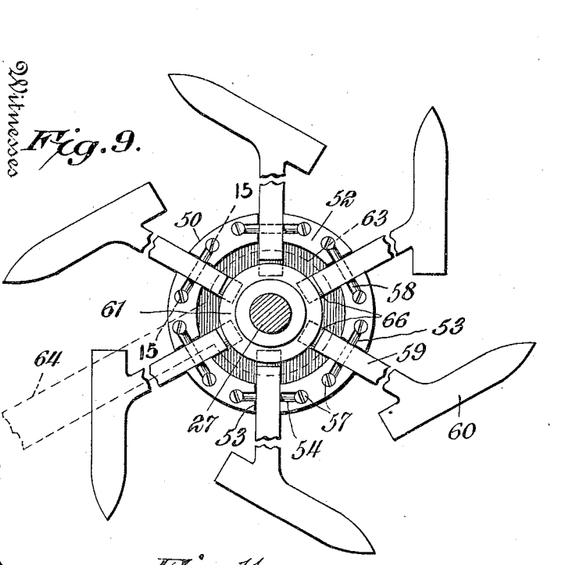
Fig. 9 is an elevation of one-half of the picker structure with the picker shaft in cross section.

The picker shaft 27 extends beyond its bearings in the bars 25 at one end carrying a sprocket wheel 47, by means of which motion is imparted to the shaft 27 through the intermediary of a sprocket chain 48 passing about a sprocket wheel 49 on the shaft 23 adjacent the inner edge of the beam 4. Since the axis of movement of the bars 25 and 26 is coincident with the longitudinal axis of the shaft 23 the chain 48 will always remain in suitable relation to the sprocket wheels 47 and 49. The picker mechanism is best shown in Figs. 9 to 12, taken in connection with the showing of Fig. 1, and reference may now be had to these figures.

Figure 10:
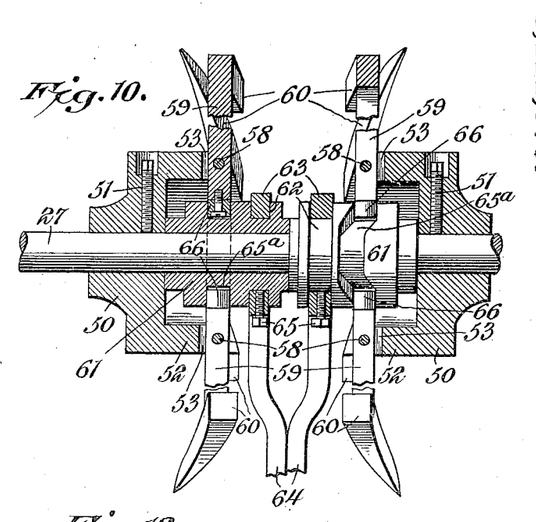
Fig. 10 is a section of the picker structure in a plane in part axial to the picker shaft and in part showing some portions of the structure in elevation.
Figure 11:
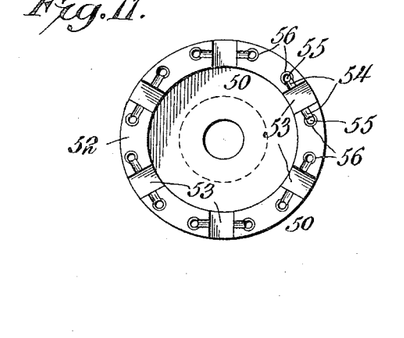
Fig. 11 is a detail view of one end of one of the picker hubs.
Figure 12:
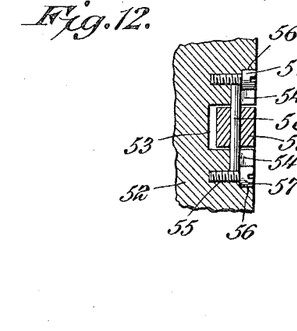
Fig. 12 is a section on the line 15—15 of Fig. 9.

Fast to the shaft 27 near the central portion thereof are two spaced hubs 50, each of which is secured to the shaft 27 by a suitable set screw 51, and one face of each hub is formed with a cylindrical flange 52 concentric with the axis of the hub, said flange being formed at the edge remote from the hub with a circular series of spaced recesses 53, each of which is entered on each side by a smaller recess 54 terminating at the end remote from the recess 53 in a threaded socket 55 counterbored at the outer end, as indicated at 56, said socket being designed to receive a screw 57, preferably of the type with a fillister head. The recesses 54 are in line one with the other and in substantially tangential relation to a circle concentric with the shaft 27 and intermediate of the face of the flange 52 in which the recesses 53 and 54 are formed. Each pair of recesses 54 on opposite sides of a recess 53 receives a pivot pin 58 held in place by the heads of the screws 57, the removal of the screws permitting the ready removal of the pivot pin 58. Each pivot pin 58 carries an arm 59 in radial relation to the shaft 27 and extending an appropriate distance radially outward from the flange 52, each arm 59 ultimately terminating in a picker head 60 which in the structure shown extends in the direction of rotation of the shaft 27 at an angle to the length of the arm 59, but so that all the picker heads 60 carried by the arms of a respective hub constitute a circular series. These picker heads 60 may be curved, as indicated in Fig. 10, in the direction of their length, as well as being at an angle to the length of the arms 59 and the curvature is such that the picker heads of one series approach at the butt ends the butt ends of the picker heads of the other series, while the other ends of the picker heads, which are more extended from the arms 59 than the butt ends and are pointed, are so related that the pointed ends of the two series recede one from the other in the direction of the length of the shaft 27.

Mounted on the shaft 27 in such manner that the shaft may turn freely therein are two collars 61 each extending from a respective hub 50 toward the other until the collars are in contact, or substantially so at a point intermediate between the two hubs 50. Each collar near its inner end is formed with an annular groove 62 in which is seated a ring 63 on one end of an arm 64, the ring being held to the collar by a set screw 65. Each arm 64 is carried rearwardly with respect to the machine and at its rear end is connected to the trough 35 of the conveyer, as shown in Figs. 1, 2, 3 and 4, these arms being brought into substantial contact at their intermediate portions. The arms 64 are so connected to the trough as to be movable laterally with respect thereto to permit a limited movement of the shaft 27 and picker carried thereby in the direction of the length of the shaft. Each collar 61 is formed with a circumferential cam groove 65$^a$ and this cam groove is entered by a roller 66 on the inner end of each arm 59, the arms 59 being of sufficient length for the purpose, so that as the hubs 50 are rotated by the shaft 27, the arms 59 will be rocked on the pivot pins 58, and the heads 60 will be caused to approach and recede as the picker is rotated at such point or points in the rotation as may be determined by the position of the cam grooves 65. The position of the cam grooves with relation to their action on the picker arms and heads may be changed as required by loosening the set screws 65 and turning the collars 61 to the desired extent, after which the set screws 65 may be again tightened, thereby fixing the collars 61 against rotative movement.

It is desirable that the picker shaft be capable of movement in the direction of its longitudinal axis, so that the picker may be adjusted laterally with relation to the length of the machine. For this purpose the sprocket wheel 47 may be splined upon the shaft 27 and held against movement in the direction of the longitudinal axis of said shaft by a bracket 67 fast on the bar 26, this bracket permitting the rotative movement of the sprocket wheel 47 but preventing it from participating in the longitudinal adjustment of the shaft 27.

In order to cause the longitudinal movement of the shaft 27 there is mounted on the bar 25 a lever 68 by means of a yoke bracket 69 fast to the bar 25 and serving as a fulcrum for the lever 68. One end of the lever 68 is formed into an eye 70 transversed by a stud 71 formed by reducing the end of the shaft 27 or otherwise, and this eye is held on the stud by a nut 72, this construction permitting the rotation of the shaft 27 without interference, but causing the participation of the shaft in any movement of the lever 68 about its fulcrum 69. The other end of the lever 68 is provided with a perforation 73 receiving an angle or crank extension 74 of a rock shaft 75 provided near the crank 74 with a bearing 76 fast to the beam 3 and from there extending toward the front of the machine, where it is bent into another crank extension 77 terminating in an eye 78 receiving a similar eye on the end of an arm 79 operatively connected to another arm 80, which in turn is connected at the end remote from that connected to the arm 79 to one end of a bell crank lever 81 pivoted on a bracket 82 depending from the beam 3 near the front of the machine. The other end of the bell crank lever 81 is connected by a link 83 to the short end of a latch lever 84 carried by the beam 3 and extending to a point within ready reach of the operator of the machine, as will hereinafter appear.

Fast to the inner or rear face of the front beam 6 are spaced brackets 85 carrying between them a rod 86, which close to the respective brackets in turn carries hangers 87 in the form of links, the hangers depending and at their lower ends connected by a rod 88 extending from one hanger to the other. The rod 88 carries intermediately a block 89 to which on each side of the draft line of the machine, such draft line being the center line, there is pivoted a yoke 90 in straddling relation to the block and having its pivot connection in an axis perpendicular to the length of the rod 88 and, considering the machine is in operative position, such pivot connection is substantially vertical. The two yokes 90 carry respective bars 91, 92 extending from the yokes toward the rear of the machine, and at an intermediate point each bar 91, 92 is bent as shown at 93 in a direction toward the respective beams 3 or 4, as the case may be, and from this bend 93 each bar is continued toward the rear of the machine until in overhanging relation to the picker adjacent the bars 25 or 26, the bar 91 terminating adjacent the bar 25 and the bar 92 terminating adjacent the bar 26. The rear of each bar 91—92 is pivotally connected to a respective bar 25 or 26, as the case may be, by a link 94. Each bar 91—92 to the rear of the bend 93 carries a block 95 secured thereto by bolts 96, so that the block may be adjusted lengthwise of this bar, and through each block is a perforation for another bar 97 constituting the shank of a plow share 98, the shank 97 being held to the block 95 in any desired position of adjustment by a set screw 99 or otherwise.

Depending from the longitudinal beams 3 and 4 and from a cross piece 100ª are blocks 100, each carrying at an intermediate point a bearing 102 for the rock shaft 75. The bar 91 near its yoke 90 carries a bearing 103 for a bolt 104 or other suitable connection securing the two arms 79 and 80 together at their meeting ends. Because of the connection of the arm 80 with the bearing 103 and the connection of the latter with the bar 91, the latter participates in any movement of the arm 80 caused by a manipulation of the latch lever 84 and since the two bars 91 and 92 are connected to a common block 89 both bars will be shifted laterally with reference to the draft line of the machine along the rod 88 and the plows 98 will participate in this lateral shift. Furthermore, the arm 79 is moved on the movement of the arm 80 in a direction to rock the rock shaft 75 in its bearings, and consequently the lever 68 is rocked with relation to the arm 25 and the shaft 27 with a picker thereon is shifted to one side or the other with reference to the central draft line, but the construction is such that the direction of lateral shift of the plows and of lateral shift of the picker is the same. The operator may, therefore, by manipulating the lever 84 shift the plows and picker to one side or the other with reference to the draft line to bring the plows and picker into proper relation to a row of beets, as will hereinafter appear, without the necessity of changing the direction of the line of draft which would mean the turning of the entire machine to one side or the other. It will be understood, of course, that the lever 84 has its latch in operative relation to a segmental rack 105, as is common in structures of this character, the rack being fast on an appropriate portion of the beam 3.

It is desirable, of course, that the picker and the plows be movable toward and from the ground to either clear the ground entirely, as when the machine is being moved from place to place and the active operation of the machine is not desired, or when it is desirable to cause the entrance of the plows and picker to different distances into the ground. For this purpose the two bars 91 and 92 are connected back of the bend 93 by a rod 106 threaded at the ends and there provided with nuts 107, the rod 106 and nuts 107 being employed to secure the free ends of the legs of a yoke 108 to the two bars 91 and 92, the rod 106 serving to hold the bars 91 and 92 in any desired position of separation, different degrees of separation being permitted by the pivoted yokes 90 and the links 94 at the two ends of the bars, and, furthermore, the yoke 108 may be sufficiently flexible to permit different adjustments of the bars 91 and 92 with respect to their distance apart. The yoke member 108 close to the intermediate connecting portion is perforated in both leg portions for the passage of a crank shaft 109 journaled at the ends in the respective beams 3 and 4. The shaft 109 extends through the beam 4 and has secured thereto beyond the outer edge of the beam a latch lever 110 in operative relation to a rack segment 111 fast to the beam 4. By an appropriate manipulation of the lever 110 the crank shaft 109, which has its crank portion extending above the plane of the beams 3 and 4, may be moved into substantial coincidence or parallel relation with the legs of the yoke 108 or may be moved so that the connected portion of the crank part of the shaft 109 approaches the plane of the beams. In the first instance the movement of that portion of the crank shaft 109 carrying the yoke 108 is a lifting movement, and in the second instance it is a lowering movement, so that the bars 91 and 92 and parts carried thereby will be elevated, the bars 91 and 92 turning about the rod 88 as a center, or the bars 91, 92 and the parts carried thereby may be lowered, depending upon the direction of movement of the lever 110, and this lever may be locked in any adjusted position by the engagement of its latch with the rack segment 111. The bars 25 and 26 are pivoted at their rear ends and the bars 91 and 92 are pivoted at their front ends, and to accommodate the relative change of position of these several bars when elevated or lowered by the lever 110, the carrying links 87 are provided, this construction imparting a desired flexibility to the connected bars. Mounted on the beams 3 and 4 is a seat 164 to accommodate the operator and the several operating and controlling levers are suitably grouped with reference to the operator's seat for convenient handling.

The conveyer chain 38 is driven by the shaft 36, which carries a sprocket wheel 37ª driven by a sprocket chain 38ª coming from a sprocket wheel 21ª on the shaft 21. The machine of the present invention is designed more particularly for harvesting beets, especially sugar beets, which are planted in rows with furrows on opposite sides, and the machine is so constructed that the traction wheels and the draft horses may follow the furrows, while the harvesting mechanisms travel along the crown of the ridges where the beets are growing. Assuming that the machine has been properly adjusted, it is directed into the field where the beets are to be harvested. The dirt of the hill or ridge surrounding the beet is liable to be more or less compacted, and the dirt around the root of the beet is loosened up by the action of the plows 98, which are so positioned as to engage the dirt and loosen the beet root. Directly after the passage of the plows, the picker heads 60 come in engagement with the beets, and these heads are at this time at their closest approach, although the pointed ends of the heads are divergent, the result being that these heads engage the beet with the points sufficiently separated, so as not to pierce the beet root, while the converging portions engage the beet root, and the continued rotative movement of the picker causes a lifting of the beet from the ground, at the same time removing from the beet practically all of the dirt which may cling to it. The beet is carried by the picker away from the ground and upward and then backward until it finally reaches a point where the picker heads under consideration begin their downward movement, when they are separated by the action of the cam grooves 65 to release the beet and permit it to fall upon the fingers 41 of the conveyer trough 35 into which the released beet is carried by the conveyer belt to be discharged at the rear end of the machine.

It sometimes transpires that the rows of beets are not in straight lines or parallel with the furrows, and then in order that the plows and picker may operate properly the lever 84 is manipulated to shift the plows and picker laterally, whereby the beets are loosened and lifted without being either pierced by the picker head or missed entirely thereby, the operator manipulating the lever 84 from time to time as may be necessary, the other levers usually requiring no manipulation during the beet harvesting operation, but are used more particularly for carrying the operative parts out of active position when the machine is being drawn along a road or from one field to another.

The sprocket wheels 12, 14, 18, 20 and 22, and the traction wheels 10 are all adjustable along their respective shafts or axles, so as to change the width of the machine as may be found desirable under different conditions.

What is claimed is:—

1. In a beet harvester, means for loosening the dirt about the beets in the ground, means for lifting the beets from the ground, and means for shifting the dirt loosening means and the dirt lifting means laterally with reference to the direction of travel of the machine.

2. In a beet harvester, plows for loosening the dirt about beets in the ground, a picker for lifting the beets from the ground, and means for shifting both the plows and the picker laterally with reference to the direction of travel of the machine.

3. In a beet harvester, means for loosening the dirt about the beets in the ground, means for lifting the beets from the ground, means for shifting the dirt loosening and the dirt lifting means laterally with reference to the direction of travel of the machine, and means for elevating and lowering the dirt loosening and beet lifting means with reference to the ground.

4. In a beet harvester, a picker, means for elevating and lowering the picker with reference to the ground, and means for shifting the picker laterally with reference to the line of travel of the machine, the means for elevating and lowering the picker participating in the lateral movement thereof.

5. In a beet harvester, a rotatable picker provided with an actuating shaft, pivot supports for the shaft, elevating and lowering means for said pivot supports for elevating and lowering the shaft with reference to the ground, and means participating in the movement of the supports and capable of movement independently thereof for imparting to the shaft movement in the direction of the length of the latter.

6. In a beet harvester, a picker, a supporting shaft therefor, carrying bars for the shaft each traversed at one end by the shaft, pivotal supports for the other ends of the bars, means for moving the bars about their pivotal supports to elevate and lower the picker, and a lever carried by one of the bars and connected at one end to the shaft to impart to said shaft a movement in the direction of its length.

7. In a beet harvester, a frame, a picker, a shaft therefor, means for imparting rotative movement to the picker, supporting bars for the picker shaft each provided at one end with a journal bearing for the shaft, a pivotal support for the other end of each bar, a lever mounted on one of the bars and connected at one end to the shaft to impart longitudinal movement thereto, and a link and lever system carried by the frame for imparting movement to the lever connected to the picker shaft.

8. In a beet harvester, a frame, a picker and shaft therefor, means for imparting rotative movement to the picker, supporting bars for the picker shaft each provided at one end with a journal bearing for the shaft, a pivot support for the other end of each bar, a lever carried by one of the bars and connected at one end to the picker shaft for imparting longitudinal movement to said shaft, pivoted arms carried by the frame and each connected at one end to a respective bar supporting the picker shaft, and a link and lever system connected to the picker shaft operating lever and to the pivoted arms for imparting movement to the said pivoted arms and to the picker shaft simultaneously in the direction of the length of said shaft.

9. In a beet harvester, a frame, a picker and shaft therefor, means for imparting rotative movement to the picker, supporting bars for the picker shaft each provided at one end with a journal bearing for the shaft, a pivot support for the other end of each bar, a lever carried by one of the bars and connected at one end to the picker shaft for imparting longitudinal movement to said shaft, pivoted arms carried by the frame and each connected at one end to a respective bar supporting the picker shaft, a link and lever system connected to the picker shaft operating lever and to the pivoted arms for imparting movement to the said pivoted arms and to the picker shaft simultaneously in the direction of the length of said shaft, and plows carried by the pivoted arms.

10. In a beet harvester, a frame, a picker provided with a carrying shaft, supporting bars for the picker shaft each provided at one end with a journal bearing for the shaft, a pivotal support for each bar at the end thereof remote from the picker shaft, a lever carried by one of the bars and connected to one end of the picker shaft for imparting movement to the latter in the direction of its length, other bars each pivoted at one end to the frame and at the other end connected to a respective bar supporting the picker shaft, a plow carried by each of the second named bars, a rock shaft provided with a rock arm engaging the lever connected to the picker shaft, an operating lever, and link and lever connections therefrom to the rock shaft and to the second named bars.

11. In a beet harvester, a frame, a picker provided with a carrying shaft, supporting bars for the picker shaft each provided at one end with a journal bearing for the shaft, a pivotal support for each bar at the end thereof remote from the picker shaft, a lever carried by one of the bars and connected to one end of the picker shaft for imparting movement to the latter in the direction of its length, other bars each pivoted at one end to the frame and at the other end connected to a respective bar supporting the picker shaft, a plow carried by each of the second named bars, a rock shaft provided with a rock arm engaging the lever connected to the picker shaft, an operating lever, and link and lever connections therefrom to the rock shaft and to the second named bars, a driving pinion on the picker shaft, and means for holding the driving pinion against participation in the longitudinal movement of said shaft.

12. In a beet harvester, a frame, traction wheels carrying the same, a countershaft in the frame, connections between one of the traction wheels and said countershaft, bars each pivotally supported at one end on said frame, a picker provided with a supporting shaft traversing the other ends of said bars, means for moving the picker shaft and picker transversely to the line of draft of the machine, driving connections between the countershaft and the picker shaft, means for holding the driving connections against participation in the longitudinal movement of the picker shaft.

13. In a beet harvester, a main frame, a picker, a mounting therefor on the main frame comprising spaced bars each pivotally supported at one end from the main frame and the bars at the other end carrying the picker and movable about their pivots for the elevation or lowering of the picker with relation to the ground, means for causing the elevation and lowering movement of the picker mounting and picker carried thereby comprising spaced bars each extending in a direction away from the picker carrying bars and pivotally supported from the main frame at the ends remote from the picker and adjacent to the latter connected to the first-named bars, and means for moving the joined bars simultaneously about their pivotal supports in a direction toward and from the ground.

14. In a beet harvester, a main frame, a picker, a pivotal support therefor provided with pivoted connections with the main frame to the rear of the picker with reference to the direction of travel of the machine, and means for elevating and lowering the picker and its support with reference to the ground comprising connected spaced bars pivotally supported from the main frame near the front thereof and extending rearwardly to the picker and there pivotally connected with the pivotal support of the picker, and a toggle adjustment for moving the said connected bars about their forward pivotal support to cause the elevation and lowering of the picker.

15. In a beet harvester, a main frame, a picker, a pivotal support therefor provided with pivoted connections with the main frame to the rear of the picker with reference to the direction of travel of the machine, and means for elevating and lowering the picker and its support with reference to the ground comprising connected spaced bars pivotally supported from the main frame near the front thereof and extending rearwardly to the picker and there pivotally connected with the pivotal support of the picker, and a toggle adjustment for moving the said connected bars about their forward pivotal support to cause the elevation and lowering of the picker, said toggle adjustment comprising a yoke member having the free ends of its legs connected to the respective connected bars, a crank shaft traversing the yoke member and carried by the main frame, and means for rocking the crank shaft at will in the direction to elevate or lower the yoke member and the connected bars therewith.

16. In a beet harvester, a picker, a pivotal support therefor, connected pivoted bars in turn connected to the pivotal support of the picker at the end of said bars remote from their pivot supports, plows carried by the connected bars intermediate of their ends, means for moving the connected bars in a direction to elevate and lower the picker, and means for causing a movement of the connected bars and of the picker in a direction transverse to the direction of travel of the machine.

17. In a beet harvester, a frame, a picker, a supporting shaft therefor, a pivotal carrier for the picker comprising spaced bars each provided at one end with a journal bearing for the picker shaft, a pivotal support on the frame for the other ends of said bars, a counter-shaft mounted on the frame, driving connections between the counter-shaft and the picker shaft, a lever carried by one of the said bars and connected at one end to the picker shaft for moving the latter longitudinally, a rock shaft carried by the frame and provided with a rock arm engaging the other end of said lever, another pair of connected bars pivotally supported at one end by the main frame and at the other end pivotally connected to the supporting bars for the picker shaft, connections between the rock shaft and one of said bars, an operating link and lever system for the second named bars and the rock shaft, means for elevating and lowering the second named bars about their pivot supports, and plows carried by the second named bars in position to be operated in advance of the picker in the direction of travel of the machine.

18. In a beet harvester, a picker, means for elevating and lowering the picker with relation to the ground, plows carried by said picker elevating and lowering means, and means for shifting the picker and the plow carrying means laterally with relation to the direction of travel of the machine.

19. In a beet harvester, a main frame, a picker, a pivotal carrier therefor mounted on the main frame, another pivotal carrier, swinging pivot connections for the second named pivotal carrier in turn mounted on the main frame, connections between the second pivotal carrier and the picker carrier, plows carried by the second named carrier, and means for elevating or lowering both carriers simultaneously at the connections between the two carriers and about their pivots.

20. In a beet harvester, a picker, a pivotal carrier therefor, another pivotal carrier, swinging pivot connections for the second named pivotal carrier, connections between the second pivotal carrier and the picker carrier, plows carried by the second named carrier, means for elevating or lowering both carriers simultaneously, and means for shifting both carriers and parts carried thereby simultaneously in a direction laterally to the direction of travel of the machine.

21. In a beet harvester, a picker, a pivotal support therefor, a pivoted conveyer in operative relation to the picker and in part overlapping the picker support, connections between the picker support intermediate of its ends and the conveyer for causing simultaneous movement of the picker support and conveyer, and means for elevating and lowering the picker support and with it the conveyer, at will.

22. In a beet harvester, a rotatable picker, a shaft carrying the picker, a support for the picker shaft pivoted at one end and at the other end having journal bearings for the picker shaft, a conveyer in part in overlapping relation to the picker support and pivoted at one end with a supporting connection between the other end of the conveyer and an intermediate part of the picker support, means for elevating and lowering the picker support and with it the end of the conveyer connected thereto, and means for driving the picker and conveyer simultaneously.

23. In a beet harvester, a rotatable picker, means for elevating and lowering the picker with relation to the ground, plows carried by said picker elevating and lowering means in advance of the picker in the direction of travel of the machine, and a conveyer for receiving beets from the picker and also participating in the elevating and lowering movements of the picker, the picker and plows being provided with means for shifting them laterally with relation to the direction of travel of the machine.

24. In a beet harvester, a picker, a pivotal carrier therefor, another pivotal carrier, swinging pivot connections for the second named pivotal carrier, connections between the second pivotal carrier and the picker carrier, plows carried by the second named carrier, a conveyer connected to the pivotal carrier for the picker, and means for elevating or lowering both carriers simultaneously.

25. In a beet harvester, plows for loosening the dirt about the beets in the ground, a picker for lifting the beets from the ground, means for shifting both the plows and the picker laterally with reference to the direction of travel of the machine, means for elevating and lowering the picker with reference to the ground, and a conveyer for receiving beets from the picker, said conveyer participating in the lifting and lowering movements of the picker with reference to the ground.

In testimony, that I claim the foregoing as my own, I have hereto affixed my signature in the presence of two witnesses.

HAMILTON DUNBAR MEEK.

Witnesses:
 GEO. C. HUNT,
 WILLIAM F. HALL.

Copies of this patent may be obtained for five cents each, by addressing the "Commissioner of Patents, Washington, D. C."